(12) United States Patent
Ihara et al.

(10) Patent No.: US 8,093,318 B2
(45) Date of Patent: Jan. 10, 2012

(54) FLAME RETARDANT POLYURETHANE RESIN COMPOSITION AND MAKING METHOD

(75) Inventors: Toshiaki Ihara, Annaka (JP); Yoshitaka Koshiro, Tokyo (JP); Shigemi Suzuki, Tokyo (JP)

(73) Assignees: Shin-Etsu Chemical Co., Ltd., Tokyo (JP); Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 12/859,381

(22) Filed: Aug. 19, 2010

(65) Prior Publication Data

US 2011/0046276 A1 Feb. 24, 2011

(30) Foreign Application Priority Data

Aug. 20, 2009 (JP) ................. 2009-190834

(51) Int. Cl.
*C08K 5/34* (2006.01)
*C08K 5/3492* (2006.01)
*C08K 5/521* (2006.01)
*C08K 5/053* (2006.01)
*C08K 3/32* (2006.01)
*C08L 83/04* (2006.01)

(52) U.S. Cl. ........ 524/100; 524/148; 524/387; 524/416; 524/858

(58) Field of Classification Search .............. 523/179; 524/100, 148, 387, 416, 858
See application file for complete search history.

(56) References Cited

U.S. PATENT DOCUMENTS

| | | | | |
|---|---|---|---|---|
| 4,999,383 A | * | 3/1991 | Blount | 521/103 |
| 6,329,460 B1 | * | 12/2001 | Ishikawa et al. | 524/506 |
| 6,444,315 B1 | * | 9/2002 | Barfurth et al. | 428/403 |
| 6,706,774 B2 | | 3/2004 | Munzenberger et al. | |
| 7,695,651 B2 | | 4/2010 | Matsumura et al. | |
| 2006/0192186 A1 | * | 8/2006 | Matsumura et al. | 252/601 |

FOREIGN PATENT DOCUMENTS

| | | |
|---|---|---|
| EP | 1 127 908 A1 | 8/2001 |
| EP | 1 564 243 A1 | 8/2005 |
| JP | 5-70542 A | 3/1993 |
| JP | 2001-294645 A | 10/2001 |
| JP | 2003-3116 A | 1/2003 |
| JP | 2006-111844 A | 4/2006 |

OTHER PUBLICATIONS

European Search Report issued Dec. 17, 2010, in European Patent Application No. 10251417.1

* cited by examiner

*Primary Examiner* — Kriellion Sanders
(74) *Attorney, Agent, or Firm* — Birch, Stewart, Kolasch & Birch, LLP

(57) ABSTRACT

A polyurethane resin composition comprising (A) a polycarbonate base polyurethane resin, (B) a P and N-containing non-halogen flame retardant, (C) a polyhydric alcohol, and (D) a silicone containing at least two reactive functional groups in the molecule obviates the problems of safety, environment and price and has sufficient flame retardance and improved mechanical properties such as tensile strength and elongation.

6 Claims, No Drawings

FLAME RETARDANT POLYURETHANE RESIN COMPOSITION AND MAKING METHOD

CROSS-REFERENCE TO RELATED APPLICATION

This non-provisional application claims priority under 35 U.S.C. §119(a) on Patent Application No. 2009-190834 filed in Japan on Aug. 20, 2009, the entire contents of which are hereby incorporated by reference.

TECHNICAL FIELD

This invention relates to a flame retardant polyurethane resin composition which meets the requirements of safety, environment and price and has flame retardance and improved mechanical properties such as tensile strength and elongation, and a method for preparing the composition.

BACKGROUND ART

The currently increasing concern about safety and environment facilitates a replacement of traditional flame retardants. For example, halogen based flame retardants such as bromine and chlorine based flame retardants have high flame retardance and afford the advantage that they may be used in so small amounts that compositions loaded therewith may maintain mechanical strength. However, they have a problem of safety in that in case of fire, they generate a substantial volume of halogen gas, by which people within a building may be suffocated and at worst exposed to the risk of death. Phosphate based flame retardants tend to be leached out of the resin surface, posing concerns about toxicity and mutagenesis when discharged into the environment. Red phosphorus based flame retardants have a high level of flame retardance due to a high phosphorus concentration, but generate highly toxic phosphine gas upon incomplete combustion, and red phosphorus itself has the risk of ignition by friction or impacts. Manufacturers refrain from using these traditional halogen, phosphate, and red phosphorus based flame retardants because of potential impacts on safety and environment.

Under these circumstances, it would be desirable to formulate polyurethane to be flame retardant. Polyurethane, which is synthesized by polyaddition reaction between diisocyanate and polyol, has a number of advantages including abrasion resistance, elasticity, weather resistance and solvent resistance, and now find a wide variety of applications. For example, thermoplastic urethane elastomers are used as hoses, tubes, cables, sheets, films, watch bands, and sports shoes. Urethane foams are used as sealants, fillers, and thermal insulators. Recently, the automotive industry started using urethane foams as suspension arm bushings, bump stoppers, engine mounts, bumpers, arm rests, head rests, seat cushions, and the like.

A number of techniques have been proposed for the flame retardation of polyurethane. For example, JP-A H05-70542 and JP-A 2003-003116 disclose urethane resins having phosphorus incorporated in their skeleton using phosphorus-containing polyols. Since the starting reactant, phosphorus-containing polyol is expensive, this method is not accepted in most applications or used in practice.

JP-A 2001-294645 discloses a urethane resin having halogen incorporated in its skeleton using a halogen-containing polyol. However, the starting reactant is expensive, and the use of halogen indicates a lack of safety.

It is also known to add halogen compounds, halogen-phosphorus compounds, halogenated polyethers, halogenated phosphates, and combinations of halogen with antimony trioxide as the filler. This method also lacks safety because halogen is used.

As mentioned above, attempts to render polyurethane resins flame retardant encounter many difficulties. At present, there are available no flame retardant polyurethane resin compositions having sufficient flame retardance to clear a V-0 rating of UL-94 and improved mechanical properties (such as tensile strength and elongation) while overcoming the problems of safety, environment and price.

Citation List
Patent Document 1: JP-A H05-70542
Patent Document 2: JP-A 2003-003116
Patent Document 3: JP-A 2001-294645 (EP 1127908, U.S. Pat. No. 6,706,774)

DISCLOSURE OF INVENTION

An object of the invention is to provide a flame retardant polyurethane resin composition which obviates the problems of safety, environment and price and has sufficient flame retardance and improved mechanical properties such as tensile strength and elongation.

The inventors have found that a polyurethane resin composition comprising (A) a polycarbonate base polyurethane resin as a main component, (B) a non-halogen flame retardant containing phosphorus and nitrogen, (C) a polyhydric alcohol or derivative thereof as a flame retardant adjuvant, and (D) a silicone containing at least two reactive functional groups in the molecule obviates the problems of safety, environment and price and has sufficient flame retardance and improved mechanical properties such as tensile strength and elongation.

In one aspect, the invention provides a flame retardant polyurethane resin composition comprising
(A) 100 parts by weight of a polyurethane resin,
(B) 5 to 25 parts by weight of a non-halogen flame retardant containing phosphorus and nitrogen,
(C) 1 to 15 parts by weight of a polyhydric alcohol or derivative thereof, and
(D) 1 to 15 parts by weight of a silicon compound selected from organoalkoxysiloxanes and organohydroxysiloxanes having a weight average molecular weight of 150 to 10,000 and containing per molecule 10 to 85% by weight in total of alkoxy or hydroxy groups, represented by the average compositional formula (1):

$$R^1{}_\alpha Si(OX)_\beta O_{(4-\alpha-\beta)/2} \qquad (1)$$

wherein $R^1$ is each independently an optionally substituted alkyl, alkenyl or aryl group, X is $C_1$-$C_{10}$ alkyl or hydrogen, $\alpha$ is a real number of 0.0 to 3.0, $\beta$ is a real number of 0.1 to 3.0, and $\alpha+\beta<4.0$.

Preferably the polyurethane resin (A) is a polycarbonate base polyurethane resin.

The non-halogen flame retardant containing phosphorus and nitrogen (B) is typically selected from guanidine phosphate, ammonium phosphate, melamine phosphate, ammonium polyphosphate, melamine surface-coated ammonium polyphosphate, silicon compound surface-coated ammonium polyphosphate, and mixtures thereof.

Preferably the polyhydric alcohol or derivative (C) is pentaerythritol or a pentaerythritol derivative. Also preferably, the polyhydric alcohol or derivative (C) is present in an amount which is equivalent to or less than the non-halogen flame retardant containing phosphorus and nitrogen (B).

In another aspect, the invention provides a method for preparing the flame retardant polyurethane resin composition, comprising the steps of heat melting component (A), and mixing at least components (B), (C) and (D) in the molten component (A), with the proviso that at least components (B) and (D) must not be premixed at a time of at least 1 hour before the mixing step.

Advantageous Effects of Invention

The flame retardant polyurethane resin composition of the invention meets the requirements of safety, environment and price and offers the advantages of flame retardance and mechanical properties such as tensile strength and elongation.

DESCRIPTION OF EMBODIMENTS

The flame retardant polyurethane resin composition is defined herein as comprising (A) a polyurethane resin, (B) a non-halogen flame retardant containing phosphorus and nitrogen, (C) a polyhydric alcohol or derivative thereof, and (D) a specific silicon compound as essential components.

(A) Polyurethane Resin

A polyurethane resin as component (A) may be obtained from reaction of an active hydrogen compound in the form of a polyol with a chain extender and a polyisocyanate.

The polyol used herein may be any of well-known polyols commonly used in polyurethane manufacture, preferably those polyols having a number average molecular weight of 1,000 to 10,000 as measured by the quantitative analysis of end group. Suitable polyols include polyester base polyols, polyether base polyols, polycarbonate base polyols, polylactone base polyols, and polysiloxane polyols. Inter alia, polycarbonate base polyols are preferred from the standpoints of heat resistance and mechanical strength. Exemplary polycarbonate base polyols are poly(1,6-hexane carbonate diol) and poly(1,4-butylene carbonate diol).

The chain extender used herein may be any of well-known chain extenders commonly used in polyurethane manufacture, preferably those chain extenders having a number average molecular weight of up to 250 as measured by the quantitative analysis of end group. Examples of the chain extender include aliphatic glycols such as ethylene glycol, diethylene glycol, triethylene glycol, dipropylene glycol, tripropylene glycol, 1,2-propane diol, 1,2-butane diol, 1,3-butane diol, 1,4-butane diol, 1,5-pentane diol, 1,6-hexane diol, 3-methyl-1,5-pentane diol, 1,8-octane diol, 1,9-nonane diol, and neopentyl glycol; alicyclic glycols such as bishydroxymethylcyclohexane and cyclohexane-1,4-diol; and aromatic glycols such as xylylene glycol. Although the amount of the chain extender used is not particularly limited, it is preferably in a range of 5 to 30% by weight based on the thermoplastic polyurethane.

The polyisocyanate used herein may be any of well-known polyisocyanates commonly used in polyurethane manufacture. Examples of suitable polyisocyanate include aliphatic isocyanates such as 1,6-hexamethylene diisocyanate (HDI), 2,2,4-trimethylhexamethylene diisocyanate, lysine methyl ester diisocyanate, methylene diisocyanate, isopropylene diisocyanate, lysine diisocyanate, 1,5-octylene diisocyanate, and dimer acid diisocyanate; alicyclic isocyanates such as 4,4'-dicyclohexylmethane diisocyanate, isophorone diisocyanate (IPDI), hydrogenated tolylene diisocyanate, methylcyclohexane diisocyanate, 4,4'-isopropylidenedicyclohexyl diisocyanate; and aromatic isocyanates such as 2,4- or 2,6-tolylene diisocyanate (TDI), 4,4'-diphenylmethane diisocyanate (MDI), 1,5-naphthylene diisocyanate, xylene diisocyanate (XDI), triphenylmethane triisocyanate, tris(4-phenylisocyanate)thiophosphate, tolidine diisocyanate, p-phenylene diisocyanate, diphenyl ether diisocyanate, and diphenylsulfone diisocyanate.

While a polyurethane resin may be prepared by reacting the foregoing reactants, the preparation method is not particularly limited. Any prior art well-known polyurethane preparation methods may be used. A ratio of the total of all active hydrogen-containing reactants such as polyol and the chain extender to the polyisocyanate is preferably in the range between 0.95 and 1.10 as an equivalent ratio of NCO/active hydrogen-containing group (such as OH).

(B) Flame Retardant

Component (B) is a non-halogen flame retardant containing phosphorus and nitrogen. Preferred flame retardants include guanidine phosphate, ammonium phosphate, melamine phosphate, ammonium polyphosphate, melamine surface-coated ammonium polyphosphate, and silicon compound surface-coated ammonium polyphosphate, which may be used alone or in admixture of two or more. From the standpoint of flame retardance, preference is given to ammonium polyphosphate, melamine surface-coated ammonium polyphosphate, and silicon compound surface-coated ammonium polyphosphate, with the silicon compound surface-coated ammonium polyphosphate being most preferred.

The phosphorus and nitrogen-containing compounds such as ammonium polyphosphates are commercially available. When these compounds are surface treated with silicon compounds, such properties as water repellency, dispersion in resins, and controlled leaching of phosphoric acid may be improved. While suitable silicon compounds used in surface treatment include silanes, silicone oils, and silicone resins, the cohydrolytic condensates described in JP-A 2006-111844 are preferred for effective coverage.

The phosphorus and nitrogen-containing non-halogen flame retardant is preferably present in an amount of 5 to 25 parts by weight relative to 100 parts by weight of the urethane resin. The amount of the non-halogen flame retardant is more preferably 5 to 20 parts, and even more preferably 5 to 15 parts by weight relative to 100 parts by weight of the urethane resin. Less than 5 pbw of the flame retardant may fail to provide the desired flame retardant effect whereas more than 25 pbw of the flame retardant may detract from tensile strength and elongation.

The phosphorus and nitrogen-containing non-halogen flame retardant is in the form of particles, preferably having an average particle size of 1 to 25 μm, more preferably 5 to 18 μm. It is noted that the average particle size is determined as a weight average value or median diameter, for example, using a particle size distribution analyzer relying on the laser light diffraction technique.

(C) Polyhydric Alcohol

Component (C) is a polyhydric alcohol or derivative thereof. Examples include pentaerythritol, sorbitol, dipentaerythritol, and derivatives thereof. The polyhydric alcohol or derivative may be used alone or in admixture of two or more.

Exemplary polyhydric alcohol derivatives include pentaerythritol monostearate, pentaerythritol distearate, and ditrimethylsilylated pentaerythritol. In the practice of the invention, pentaerythritol or pentaerythritol derivatives are preferably used.

The polyhydric alcohol or derivative is preferably present in an amount of 1 to 15 parts by weight relative to 100 parts by weight of the urethane resin. Less than 1 pbw of the polyhydric alcohol may fail to improve flame retardance whereas more than 15 pbw may lead to substantial drops of flame retardance and tensile strength. The amount of polyhydric alcohol or derivative (C) should preferably be equivalent to or less than the phosphorus and nitrogen-containing non-halogen flame retardant (B). Inclusion of the polyhydric alcohol in excess of a stoichiometric equivalence of the flame retardant may detract from flame retardance.

(D) Silicon Compound

Component (D) is a silicon compound selected from organoalkoxysiloxanes and organohydroxysiloxanes having a weight average molecular weight (Mw) of 150 to 10,000 and containing per molecule 10 to 85% by weight in total of alkoxy or hydroxy groups, represented by the average compositional formula (1):

$$R^1_\alpha Si(OX)_\beta O_{(4-\alpha-\beta)/2} \qquad (1)$$

wherein $R^1$ is each independently an optionally substituted alkyl, alkenyl or aryl group, X is $C_1$-$C_{10}$ alkyl or hydrogen, $\alpha$ is a real number of 0.0 to 3.0, $\beta$ is a real number of 0.1 to 3.0, and $\alpha+\beta<4.0$.

The silicon compound of formula (1) preferably has a Mw of 150 to 10,000, more preferably 200 to 6,000. A silicon compound with a Mw of less than 150 may fail to develop the desired flame retardance whereas a Mw in excess of 10,000 may lead to a decline of tensile strength.

In the average compositional formula (1), the total of alkoxy or hydroxy groups of OX is preferably 10 to 85% by weight and more preferably 20 to 60% by weight. If the total of alkoxy or hydroxy groups is less than 10 wt %, flame retardance may decrease. If the total of alkoxy or hydroxy groups is more than 85 wt %, the appearance of the composition may be compromised.

The silicon compound is preferably present in an amount of 1 to 15 parts by weight relative to 100 parts by weight of the urethane resin. If the amount of the silicon compound is less than 1 pbw or more than 15 pbw, flame retardance may become insufficient.

The silicon compound can be prepared by the following two typical synthesis methods. One method is by adding dropwise a chlorosilane to a mixture of water and an alcohol, effecting hydrolytic reaction, separating off the water layer at the end of reaction, dehydrochlorination, neutralization, filtration, and vacuum concentration. The other method is by adding an alkali or acid catalyst to a mixture of alkoxysilanes or alkoxysiloxane oligomers and optionally cyclic siloxanes (e.g., tetramer or pentamer), effecting equilibration reaction, adding dropwise water thereto, effecting hydrolytic reaction and subsequent condensation reaction, neutralizing and concentrating the reaction product.

(E) Others

Besides components (A) to (D), various additives may be compounded in the flame retardant polyurethane resin composition for a particular purpose as long as they do not interfere with the desired properties of the composition. Suitable additives include antioxidants, UV absorbers, stabilizers, photostabilizers, compatibilizing agents, non-halogen flame retardants of different type, lubricants, fillers, adhesive aids, and rust preventives.

Examples of the antioxidant used herein include
2,6-di-t-butyl-4-methylphenol,
n-octadecyl-3-(3',5'-di-t-butyl-4-hydroxyphenyl)propionate,
tetrakis[methylene-3-(3,5-di-t-butyl-4-hydroxyphenyl)-propionate]methane,
tris(3,5-di-t-butyl-4-hydroxybenzyl)isocyanurate,
4,4'-butylidenebis(3-methyl-6-t-butylphenol),
triethylene glycol bis[3-(3-t-butyl-4-hydroxy-5-methyl-phenyl)propionate],
3,9-bis{2-[3-(3-t-butyl-4-hydroxy-5-methylphenyl)propionyl-oxy]-1,1-dimethylethyl}-2,4,8,10-tetraoxaspiro[5,5]undecane,
4,4-thiobis(2-t-butyl-5-methylphenol),
2,2-methylenebis(6-t-butyl-methylphenol),
4,4-methylenebis(2,6-di-t-butylphenol),
1,3,5-trimethyl-2,4,6-tris(3,5-di-t-butyl-4-hydroxybenzyl)-benzene,
trisnonylphenyl phosphite,
tris(2,4-di-t-butylphenyl) phosphite,
distearyl pentaerythritol phosphite,
bis(2,4-di-t-butylphenyl)pentaerythritol phosphite,
bis(2,6-di-t-butyl-4-methylphenyl)pentaerythritol phosphite,
2,2-methylenebis(4,6-di-t-butylphenyl)octyl phosphite,
tetrakis(2,4-di-t-butylphenyl)-4,4'-biphenyldiphosphonite,
dilauryl-3,3'-thiodipropionate,
dimyristyl-3,3'-thiodipropionate,
pentaerythritol tetrakis(3-laurylthiopropionate),
2,5,7,8-tetramethyl-2(4,8,12-trimethyldecyl)chroman-2-ol,
5,7-di-t-butyl-3-(3,4-dimethylphenyl)-3H-benzofuran-2-one,
2-[1-(2-hydroxy-3,5-di-t-pentylphenyl)ethyl]-4,6-dipentyl-phenyl acrylate,
2-t-butyl-6-(3-t-butyl-2-hydroxy-5-methylbenzyl)-4-methylphenyl acrylate, and
tetrakis(methylene)-3-(dodecylthiopropionate)methane.

Examples of the stabilizer used herein include metal soap stabilizers such as lithium stearate, magnesium stearate, calcium laurate, calcium ricinoleate, calcium stearate, barium laurate, barium ricinoleate, barium stearate, zinc laurate, zinc ricinoleate, and zinc stearate; laurate, maleate and mercapto organotin stabilizers; lead stabilizers such as lead stearate and tribasic lead sulfate; epoxy compounds such as epoxidized vegetable oil; phosphites such as alkyl allyl phosphites and trialkyl phosphites; β-diketone compounds such as dibenzoyl methane and dehydroacetic acid; hydrotalcites and zeolites.

Examples of the photostabilizer used herein include benzotriazole UV absorbers, benzophenone UV absorbers, salicylate UV absorbers, cyanoacrylate UV absorbers, oxalic acid anilide UV absorbers, and hindered amine photostabilizers.

Examples of the compatibilizing agent used herein include acrylic organopolysiloxane copolymers, partially crosslinked products of silica and organopolysiloxane, silicone powder, maleic anhydride graft-modified polyolefins, carboxylic acid graft-modified polyolefins, and polyolefin graft-modified organopolysiloxanes.

Examples of the adhesive aid used herein include alkoxysilanes.

Examples of the non-halogen flame retardants of different type used herein include zinc borate, zinc stannate, and photooxidized titanium.

Examples of the filler used herein include silicic acid, calcium carbonate, titanium oxide, carbon black, kaolin clay, fired clay, aluminum silicate, magnesium silicate, calcium silicate, and barite.

Preparation Method

The polyurethane resin composition may be prepared in a standard procedure by heat melting component (A), and mixing components (B), (C) and (D) and optional component (E) in the molten component (A). It is unfavorable that at least components (B) and (D) be premixed at a time of at least 1 hour before the mixing step. The reason is that if a trace of phosphoric acid remains on the surface of component (B), components (B) and (D) or molecules of component (D) can react to form a resin or gel. If component (D) forms a resin or gel, then the composition may lose flame retardance from a rating of V-0 to a failure in UL-94 test (Underwriter's Laboratory Bulletin 94).

Any well-known techniques may be employed in molding the polyurethane resin composition.

EXAMPLE

Examples of the invention are given below by way of illustration and not by way of limitation. In Examples, the average particle size is measured by a laser diffraction particle size distribution analyzer in methanol solvent.

Examples 1 to 12, Comparative Examples 1 to 8 and Reference Example

Compositions were prepared by blending various ingredients as shown in Tables 1 to 4, and uniformly milling at 180° C. and 30 rpm for 3 minutes on a mixer Labo Plastomill R-60 (Toyo Seiki Seisakusho, Ltd.). The compositions were press molded at 200° C. into test samples of 2 mm thick. The test samples were evaluated for flame retardance by the UL-94 test, oxygen consumption index, tensile strength and elongation. The test results are also shown in Tables 1 to 4.

The ingredients and test methods used are described below.

Ingredients Used
(1) Resamine P-880CL: polycarbonate base polyurethane resin
(2) Resamine P-2288: polyether base polyurethane resin
(3) Resamine P-1078: polyester base polyurethane resin
(4) Resamine P-4070EX: polycaprolacton base polyurethane resin
  all Resamine resins available from Dainichiseika Color & Chemicals Mfg. Co., Ltd.
(5) Silicone surface-treated ammonium polyphosphate 1: prepared by the following procedure
  Preparation of Silicone Base Water Repellent 1
    A 500-mL four-necked flask equipped with a condenser, thermometer and dropping funnel was charged with 85 g (0.37 mole calculated as dimer) of an oligomer of methyltrimethoxysilane, 154 g of methanol, and 5.1 g of acetic acid. With stirring, 6.8 g (0.37 mole) of water was poured into the flask, and stirring was continued for 2 hours at 25° C. Then 17.7 g (0.08 mole) of 3-aminopropyltriethoxysilane was added dropwise. The mixture was heated to the reflux temperature of methanol and held at the temperature for 1 hour for reaction. With an ester adapter attached, methanol was distilled off until the interior temperature reached 110° C. There was obtained 81 g of a pale yellow clear solution having a viscosity of 71 mm$^2$/s at 25° C. as measured according to JIS K2283 and a weight average molecular weight (Mw) of 1,100. The solution (silicone base water repellent 1) contained 5 wt % of residual methanol.
  Preparation of Silicone Surface-treated Ammonium Polyphosphate 1
    To 100 parts by weight of ammonium polyphosphate (Clariant, Pekoflam® TC204P, average particle size 8 μm) were added 10 parts by weight of silicone base water repellent 1 and 100 parts by weight of ethanol. The mixture was stirred for 30 minutes, after which the ethanol was distilled off in vacuum. The residue was ground in a grinding machine, obtaining silicone surface-treated ammonium polyphosphate 1 having an average particle size of 10 μm.
(6) Pekoflam® TC204P: surface untreated ammonium polyphosphate 2, Clariant, average particle size 8 μm
(7) Pentaerythritol
(8) Dipentaerythritol
(9) Pentaerythritol distearate all pentaerythritols available from Wako Pure Chemical Industries, Ltd.
(10) Alkoxysiloxane oligomer: Compounds A to D were prepared by the following procedures.
  Compound A
    Methyltrichlorosilane was stirred in methanol below 65° C. to effect partial esterification, which solution was added dropwise to a 3:1 mixture of methanol and water to effect hydrolysis. After the lower layer containing hydrochloric acid was discarded, the remaining upper layer (organic layer) was neutralized with sodium carbonate. The salt resulting from neutralization was removed by filtration, followed by vacuum concentration above 100° C. The compound was synthesized in this way. On 29Si-NMR analysis, the compound was identified to have the average compositional formula shown below. The content of alkoxy groups was determined by placing 1.0 g of a sample in a 20-ml vial, adding a mixture of 1N KOH and isopropyl alcohol, closing the vial with a rubber plug, and heating to 170° C. in an oil bath while flowing $N_2$. An alcohol effluent through a Teflon® tube connected to the vial was analyzed by gas chromatography. From the amount of methanol thus determined, the alkoxy group content was computed. The weight average molecular weight (Mw) was computed from toluene GPC.
  Average compositional formula: $(CH_3)(OCH_3)_{1.5}SiO_{0.75}$,
  Alkoxy content: 46 wt %
  Mw: 406
  Compound B
    Synthesis was carried out by combining 100 parts by weight of Compound A with water and 1 part by weight of sulfonic acid type ion-exchange resin (resin: divinylbenzene-crosslinked polystyrene), stirring the contents at 70° C. for 5 hours, and vacuum concentration at 110° C. By similar analyses, the average compositional formula, alkoxy group content and Mw of the compound were determined.
  Average compositional formula: $(CH_3)_{1.0}(OCH_3)_{1.2}SiO_{0.9}$
  Alkoxy content: 28 wt %
  Mw: 950
  Compound C
    Synthesis was carried out by combining 100 parts by weight of Compound A with 110 parts by weight of dimethyldimethoxysilane, water, methanol, and 1 part by weight of sulfonic acid type ion-exchange resin, stirring the contents at 70° C. for 5 hours, and vacuum concentration at 110° C. By similar analyses, the average compositional formula, alkoxy group content and Mw of the compound were determined.
  Average compositional formula: $(CH_3)_{1.69}(OCH_3)_{0.31}SiO_1$
  Alkoxy content: 12 wt %
  Mw: 5,500
  Compound D
    Synthesis was carried out by combining 76 parts by weight of octamethyltetrasiloxane, 28.6 parts by weight of dimethyldimethoxysilane, and 95 parts by weight of dimethyltrimethoxysilane, stirring the contents together with water, methanol, and 1 part by weight of sulfonic acid type ion-exchange resin at 70° C. for 5 hours, and vacuum concentration at 110° C. By similar analyses, the average compositional formula, alkoxy group content and Mw of the compound were determined.

Average compositional formula: $(CH_3)_{2.16}(OCH_3)_{0.17}SiO_{0.835}$
Alkoxy content: 7 wt %
Mw: 1,950
KF-96L-5CS: by Shin-Etsu Chemical Co., Ltd.
Average compositional formula: $(CH_3)_{2.18}SiO_{0.91}$
Alkoxy content: 0 wt %
Mw: 830

Test Methods
(1) Flame retardance UL-94: tested according to the vertical burning test of UL-94
(2) Oxygen consumption index: tested according to JIS K7201
(3) Tensile strength and elongation:
A press molded sheet of 2 mm thick was punched into a dumbbell #2 specimen, which was tested according to JIS K7113.
(4) Mw:
Mw was determined by gel permeation chromatography (GPC) under the following conditions.
  (a) solvent: toluene
  (b) column: TSK gel superH5000+superH4000+superH3000+superH2000
  (c) detector: RI
  (d) flow rate: 0.6 ml/min
  (e) column temperature: 40° C.

TABLE 1

| Formulation (pbw) | | Example 1 | 2 | 3 | 4 | 5 |
|---|---|---|---|---|---|---|
| Resamine P-880CL | | 100 | 100 | 100 | 100 | 100 |
| Surface-treated ammonium polyphosphate 1 | | 20 | 20 | 20 | 25 | 15 |
| Pentaerythritol | | 9.00 | 7.00 | 5.00 | 8.75 | 5.25 |
| Compound A | | 1.00 | 3.00 | 5.00 | 3.75 | 2.25 |
| Test results | Flame retardance UL-94 | V-0 | V-0 | V-0 | V-0 | V-0 |
| | Oxygen consumption index (%) | 30.5 | 34.0 | 30.0 | 36.5 | 29.0 |
| | Tensile strength (MPa) | 22.2 | 26.0 | 19.9 | 19.7 | 27.5 |
| | Elongation (%) | 374 | 382 | 364 | 355 | 397 |

TABLE 2

| Formulation (pbw) | | Example 6 | 7 | 8 | 9 | 10 |
|---|---|---|---|---|---|---|
| Resamine P-880CL | | 100 | 100 | | | |
| Resamine P-2288 | | | | 100 | | |
| Resamine P-1078 | | | | | 100 | |
| Resamine P-4070EX | | | | | | 100 |
| Surface-treated ammonium polyphosphate 1 | | 20 | 20 | 20 | 20 | 20 |
| Pentaerythritol | | 7.00 | 7.00 | 7.00 | 7.00 | 7.00 |
| Compound A | | | | 3.00 | 3.00 | 3.00 |
| Compound B | | 3.00 | | | | |
| Compound C | | | 3.00 | | | |
| Test results | Flame retardance UL-94 | V-0 | V-0 | V-1 | V-1 | V-1 |
| | Oxygen consumption index (%) | 31.0 | 29.0 | 27.5 | 27.0 | 27.5 |
| | Tensile strength (MPa) | 28.0 | 24.3 | 20.3 | 23.5 | 23.0 |
| | Elongation (%) | 405 | 480 | 536 | 388 | 365 |

TABLE 3

| Formulation (pbw) | | Example 11 | 12 |
|---|---|---|---|
| Resamine P-880CL | | 100 | 100 |
| Surface-treated ammonium polyphosphate 1 | | 20 | 20 |
| Dipentaerythritol | | 7.00 | |
| Pentaerythritol distearate | | | 8.75 |
| Compound A | | 3.00 | 3.75 |
| Test results | Flame retardance UL-94 | V-0 | V-1 |
| | Oxygen consumption index (%) | 32.8 | 27.0 |
| | Tensile strength (MPa) | 24.8 | 20.1 |
| | Elongation (%) | 375 | 350 |

TABLE 4

| Formulation (pbw) | | Comparative Example 1 | 2 | 3 | 4 | 5 |
|---|---|---|---|---|---|---|
| Resamine P-880CL | | 100 | 100 | 100 | 100 | 100 |
| Surface-treated ammonium polyphosphate 1 | | 50 | 20 | 20 | 20 | 20 |
| Pentaerythritol | | | | 10.00 | 40.00 | 10.00 |
| Compound A | | | 10.00 | | 10.00 | 40.00 |
| Test results | Flame retardance UL-94 | V-2 | V-2 | V-2 | NG | NG |
| | Oxygen consumption index (%) | 26.0 | 24.0 | 25.5 | 23.0 | 23.5 |
| | Tensile strength (MPa) | 16.6 | 18.0 | 19.5 | 17.2 | 17.9 |
| | Elongation (%) | 459 | 350 | 369 | 346 | 358 |

TABLE 5

| Formulation (pbw) | | Comparative Example 6 | 7 | 8 | Reference Example |
|---|---|---|---|---|---|
| Resamine P-880CL | | 100 | 100 | 100 | 100 |
| Surface-treated ammonium polyphosphate 1 | | | 20 | 20 | 20 |
| Pekoflam ® TC204P | | 50 | | | |
| Pentaerythritol | | | 7.00 | 7.00 | |
| Compound D | | | 3.00 | | |
| KF-96L-5CS | | | | 3.00 | |
| a premix of 7 pbw of pentaerythritol and 3 pbw of X-21-3228 combined 1 hour before compounding | | | | | 10.00 |
| Test results | Flame retardance UL-94 | V-2 | NG | NG | NG |
| | Oxygen consumption index (%) | 26.5 | 23.0 | 23.0 | 23.0 |
| | Tensile strength (MPa) | 15.5 | 25.5 | 25.5 | 25.5 |
| | Elongation (%) | 351 | 356 | 356 | 356 |

Japanese Patent Application No. 2009-190834 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A flame retardant polyurethane resin composition comprising
   (A) 100 parts by weight of a polyurethane resin,
   (B) 5 to 25 parts by weight of a non-halogen flame retardant containing phosphorus and nitrogen,
   (C) 1 to 15 parts by weight of a polyhydric alcohol or derivative thereof, and
   (D) 1 to 15 parts by weight of a silicon compound selected from organoalkoxysiloxanes and organohydroxysiloxanes having a weight average molecular weight of 150 to 10,000 and containing per molecule 10 to 85% by weight in total of alkoxy or hydroxy groups, represented by the average compositional formula (1):

$$R^1{}_\alpha Si(OX)_\beta O_{(4-\alpha-\beta)/2} \qquad (1)$$

wherein $R^1$ is each independently an optionally substituted alkyl, alkenyl or aryl group, X is $C_1$-$C_{10}$ alkyl or hydrogen, $\alpha$ is a real number of 0.0 to 3.0, $\beta$ is a real number of 0.1 to 3.0, and $\alpha+\beta<4.0$.

2. The composition of claim 1 wherein the polyurethane resin (A) is a polycarbonate base polyurethane resin.

3. The composition of claim 1 wherein the non-halogen flame retardant containing phosphorus and nitrogen (B) is at least one member selected from the group consisting of guanidine phosphate, ammonium phosphate, melamine phosphate, ammonium polyphosphate, melamine surface-coated ammonium polyphosphate, and silicon compound surface-coated ammonium polyphosphate.

4. The composition of claim 1 wherein the polyhydric alcohol or derivative (C) is pentaerythritol or a pentaerythritol derivative.

5. The composition of claim 1 wherein the polyhydric alcohol or derivative (C) is present in an amount which is equivalent to or less than the non-halogen flame retardant containing phosphorus and nitrogen (B).

6. A method for preparing the flame retardant polyurethane resin composition of claim 1, comprising the steps of heat melting component (A), and mixing at least components (B), (C) and (D) in the molten component (A), with the proviso that at least components (B) and (D) must not be premixed at a time of at least 1 hour before the mixing step.

* * * * *